US007860268B2

(12) United States Patent
Alasia et al.

(10) Patent No.: US 7,860,268 B2
(45) Date of Patent: Dec. 28, 2010

(54) OBJECT AUTHENTICATION USING ENCODED IMAGES DIGITALLY STORED ON THE OBJECT

(75) Inventors: Alfred V. Alasia, Lake Worth, FL (US); Alfred J. Alasia, Royal Palm Beach, FL (US); Thomas C. Alasia, Wellington, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 1047 days.

(21) Appl. No.: 11/610,283

(22) Filed: Dec. 13, 2006

(65) Prior Publication Data

US 2008/0144947 A1    Jun. 19, 2008

(51) Int. Cl.
*G06K 9/00* (2006.01)
*H04L 9/32* (2006.01)
(52) U.S. Cl. ....................... 382/100; 713/176
(58) Field of Classification Search ................. 382/100, 382/232, 236; 380/51, 54, 201, 210, 252, 380/287, 229, 232, 247, 258; 283/72, 73, 283/85; 713/155, 161, 168, 170, 176, 179; 715/749; 717/173, 178
See application file for complete search history.

(56) References Cited

U.S. PATENT DOCUMENTS

| 3,784,289 | A | 1/1974 | Wicker |
| 3,937,565 | A | 2/1976 | Alasia |
| 4,914,700 | A | 4/1990 | Alasia |
| 5,113,213 | A | 5/1992 | Sandor et al. |
| 5,178,418 | A | 1/1993 | Merry et al. |
| 5,303,370 | A | 4/1994 | Brosh et al. |
| 5,396,559 | A | 3/1995 | McGrew |
| 5,438,429 | A | 8/1995 | Haeberli et al. |
| 5,708,717 | A | 1/1998 | Alasia |
| 5,712,731 | A | 1/1998 | Drinkwater et al. |
| 5,735,547 | A | 4/1998 | Morelle et al. |
| 5,867,586 | A | 2/1999 | Liang |

(Continued)

FOREIGN PATENT DOCUMENTS

EP    0 520 363 A1    12/1992

(Continued)

OTHER PUBLICATIONS

"Watermarking for Image Authentication", Wu, et al, IEEE International Conference on Image Processing, Oct. 1998, 5 pages.

(Continued)

*Primary Examiner*—Abolfazl Tabatabai
(74) *Attorney, Agent, or Firm*—Hunton & Williams LLP

(57) ABSTRACT

A method of authenticating an object using optically decodable encoded images is presented. The method comprises attaching a digital data storage medium to the object and storing an optically decodable digital encoded image in the data storage medium. The digital encoded image comprises authentication information determinable by decoding the digital encoded image. The method further comprises downloading the digital encoded image from the digital data storage medium and applying a digital decoding algorithm to the captured digital image to establish a decoding result. The decoding result is then compared to object authentication criteria to establish an authentication result.

42 Claims, 5 Drawing Sheets

U.S. PATENT DOCUMENTS

| | | | |
|---|---|---|---|
| 5,946,414 A * | 8/1999 | Cass et al. | 382/183 |
| 5,960,081 A | 9/1999 | Vynne et al. | |
| 5,974,150 A * | 10/1999 | Kaish et al. | 713/179 |
| 6,104,812 A * | 8/2000 | Koltai et al. | 380/51 |
| 6,139,066 A * | 10/2000 | Mowry et al. | 283/93 |
| 6,166,664 A * | 12/2000 | Acharya | 341/63 |
| 6,177,683 B1 | 1/2001 | Kolesar et al. | |
| 6,216,228 B1 | 4/2001 | Chapman et al. | |
| 6,222,650 B1 | 4/2001 | Long | |
| 6,252,963 B1 | 6/2001 | Rhoads | |
| 6,256,150 B1 | 7/2001 | Rosenthal | |
| 6,329,987 B1 | 12/2001 | Gottfried et al. | |
| 6,343,138 B1 | 1/2002 | Rhoads | |
| 6,397,334 B1 | 5/2002 | Chainer et al. | |
| 6,536,665 B1 | 3/2003 | Ray et al. | |
| 6,636,332 B1 | 10/2003 | Soscia | |
| 6,859,534 B1 * | 2/2005 | Alasia | 380/51 |
| 7,089,420 B1 | 8/2006 | Durst et al. | |
| 7,337,953 B2 * | 3/2008 | Sgambati et al. | 235/379 |
| 2001/0005570 A1 | 6/2001 | Daniel et al. | |
| 2002/0042884 A1 | 4/2002 | Wu et al. | |
| 2002/0054680 A1 | 5/2002 | Huang et al. | |
| 2003/0012374 A1 | 1/2003 | Wu et al. | |
| 2003/0012562 A1 | 1/2003 | Lawandy et al. | |
| 2003/0039195 A1 | 2/2003 | Long et al. | |
| 2003/0136837 A1 | 7/2003 | Amon et al. | |
| 2005/0276442 A1 | 12/2005 | Alasia et al. | |
| 2006/0029278 A1 | 2/2006 | Alasia et al. | |

FOREIGN PATENT DOCUMENTS

| | | |
|---|---|---|
| EP | 0598357 B1 | 5/1994 |
| EP | 1 136 947 A2 | 9/2001 |
| WO | WO 93/15491 | 8/1993 |
| WO | WO 94/07326 | 3/1994 |
| WO | WO 01/80512 A2 | 10/2001 |

OTHER PUBLICATIONS

"A Public Key Watermark for Image Verification and Authentication," Ping Wah Wong, IEEE, 1998.

* cited by examiner

OBJECT AUTHENTICATION USING ENCODED IMAGES DIGITALLY STORED ON THE OBJECT

FIELD OF THE INVENTION

The invention relates generally to the field of object authentication, and more particularly to authentication using optically encoded images digitally stored on or with the objects being authenticated.

BACKGROUND OF THE INVENTION

Document falsification and product counterfeiting are significant problems that have been addressed in a variety of ways. One of the more successful approaches has been the use of latent or hidden images applied to or printed on objects to be protected. These images are generally not viewable without the assistance of specialized devices that render them visible.

One approach to the formation of a latent image is to optically encode the image so that, when printed, the image can be viewed only through the use of a corresponding decoding device. Such images may be used on virtually any form of printed document including legal documents, identification cards and papers, labels currency, stamps, etc. They may also be applied to goods or packaging for goods subject to counterfeiting.

Objects to which an encoded image is applied may be authenticated by decoding the encoded image and comparing the decoded image to an expected authentication image. The authentication image may include information specific to the object being authenticated or information relating to a group of similar objects (e.g., products produced by a particular manufacturer or facility). Production and application of encoded images may be controlled so that they cannot easily be duplicated. Further, the encoded image may be configured so that tampering with the information on the document or label is readily apparent.

Authentication of documents and other objects "in the field" has typically required the use of hardware decoders such as lenticular or micro-array lenses that optically decode the encoded images. These lenses must have optical characteristics that correspond to the parameters used to encode and apply the authentication image and must be properly oriented in order for the user to decode and view the image. Lens-based decoders are typically separate from the objects being authenticated so that a single decoder can be used to authenticate many objects. For some objects, however, the decoder can be attached to or made an integral part of the object itself. Such self-authenticating objects are described in U.S. Pat. No. 7,114,750 and U.S. application Ser. No. 11/506,678, filed Aug. 18, 2006, both of which are incorporated by reference herein in their entirety.

Though hardware decoders have proven a valuable tool, they have inherent limitations. For example, because they can only be used for encoded images with corresponding characteristics, hardware decoders are relatively inflexible tools. Further, authentication using a hardware decoder generally requires on-site visual comparison of the decoded image to the authentication image by a human inspector. This raises accuracy and security concerns.

Accordingly, software-based decoders have been developed that can decode optically encoded images provided in digital form. These digital encoded images may be original digital images that have not been printed or they may be scanned-in digital images of encoded images that have been printed on an object. Software-based decoders are highly flexible in that they can be used to decode images having a variety of encoding characteristics. Also, they can be used to authenticate objects either by image comparison or by comparison of data extracted from a decoded image to object-related information.

SUMMARY OF THE INVENTION

The present invention provides systems and methods for authenticating objects and other objects using optically encoded images where digital authentication images are stored on or with the objects being authenticated. An aspect of the invention provides a method of authenticating an object comprising the action of attaching a digital data storage medium to the object and storing an optically decodable digital encoded image in the data storage medium. The digital encoded image comprises authentication information determinable by decoding the digital encoded image. The method further comprises downloading the digital encoded image from the digital data storage medium and applying a digital decoding algorithm to the captured digital image to establish a decoding result. The decoding result is then compared to object authentication criteria to establish an authentication result.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
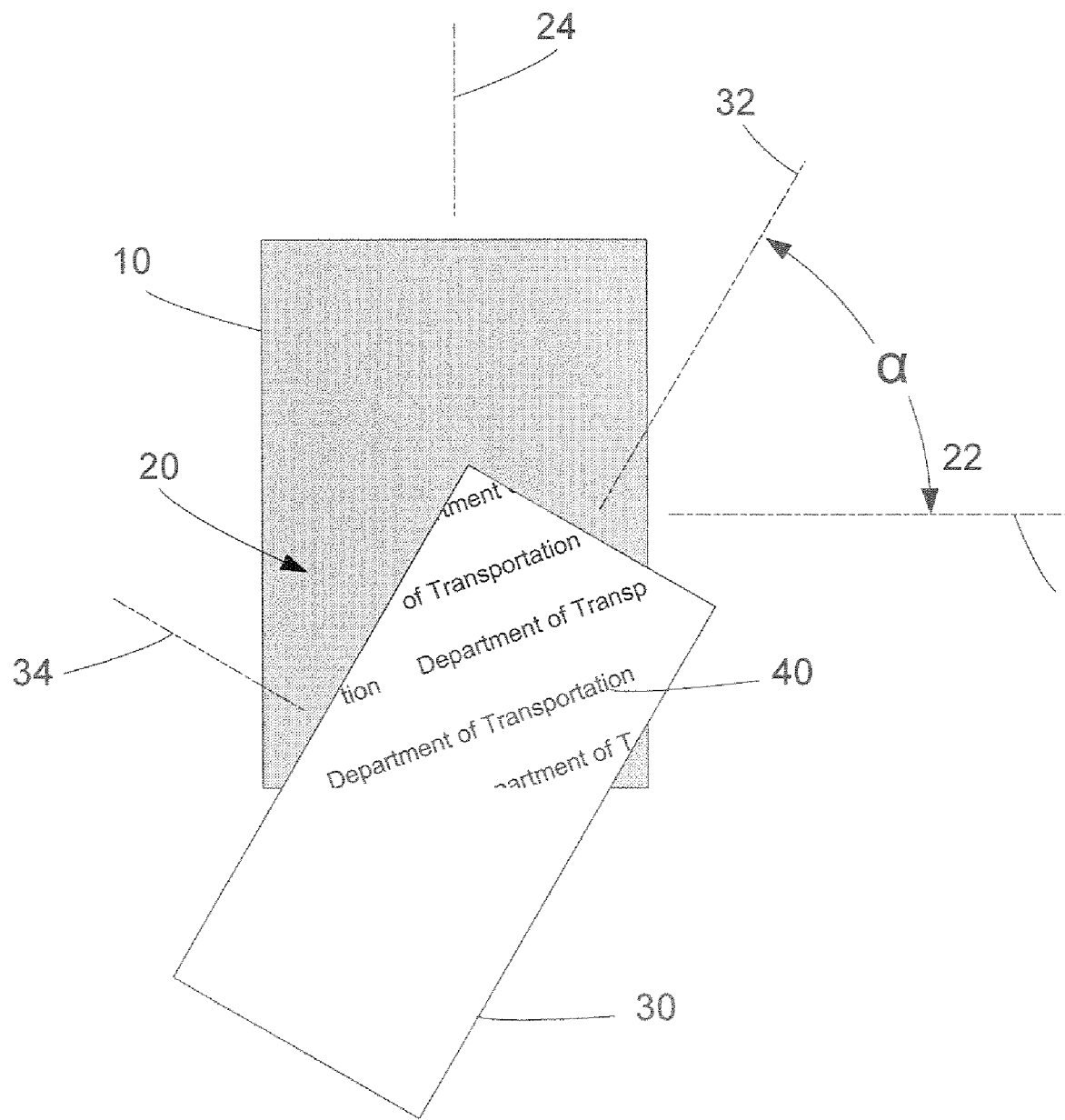
FIG. 1 is an illustration of the use of an optical decoder to decode a printed encoded image.

The present invention provides systems and methods for authenticating documents, commercial products and other objects using optically decodable encoded images. More specifically, the invention provides for authentication using encoded images stored in digital form in a storage medium or chip applied to or otherwise attached to the objects requiring authentication. These digitally stored encoded images can be downloaded or read in digital form at an inspection station and decoded using a software-based decoder. The decoded image can then be used to authenticate the object in any of various ways including but not limited to visual or automated comparison with indicia printed on the object itself, comparison with other authentication images (e.g., a decoded scanned-in image of a portion of the object) or comparison of extracted data to known information associated with the object.

Some object authentication methods using software-based decoders are described in U.S. patent application Ser. No. 11/068,350 ('350 Application), filed Feb. 28, 2005 and U.S. application Ser. No. 11/207,437 ('437 Application), filed Aug. 19, 2005, both of which are incorporated herein by reference in their entirety. These methods generally involve applying an optically encoded image to a particular area of an object to be authenticated. The object may be authenticated by capturing a digital image of that area (e.g by a digital camera or scanner) and sending the captured image to an authentication processor where the encoded image is decoded using a software-based decoder. The decoded image or information extracted therefrom can be then be compared to other information known or taken from the object.

The above methods require the capture and decoding of a digital image of the object. In many instances, it may be desirable to supplement or replace these authentication methods with an authentication approach wherein the encoded image is still in its original digital form rather than a printed form that must be digitally captured.

The present invention provides this approach by supplying authenticable objects with downloadable encoded images in digital form. These images may be stored in any storage medium that may be adhered, printed or otherwise attached to an object to be authenticated. These may include virtually any form of computer readable medium such as by way of example only, a magnetic stripe, tape or disc, integrated circuit, laser card, smart card, processor chip, memory chip, optical disc or bar code.

The authentication methodologies of the invention generally require the downloading of the digital encoded image from the on-object storge medium. Depending on the storage medium used, this may require physical interaction between the object and/or the storage medium with a download device or reader. Alternatively the invention may use remote transmission technology to pass encoded digital encoded images from on-object storage media to a remote receiver. Some embodiments, in particular, may use Radio Frequency Identification (RFID) technology.

RFID technology generally comprises an RFID tag and a remote interrogator. An RFID tag may include a processing chip and/or a digital storage medium along with a mechanism for receiving an RF command signal and, in response, processing and/or transmitting data via a return RF signal. RFID interrogators, which may also be known as readers, transceivers, or decoders (not to be confused with the encoded image decoders discussed herein) are configured to send out RF signals to RFID tags within a predetermined range and receive return signals from such tags. RFID tags may generally be divided into three main categories: (1) passive tags, which do not have any internal power source and, thus, must absorb power from an outsides source in order to transmit data; (2) semi-passive tags, which have their own internal power source but are activated only upon interrogation; and (3) active tags (also known as beacons), which have their own internal power source and may transmit data continuously or at periodic intervals.

In operation, an RFID interrogator emits an activation signal, which may be received by any RFID tags within range of the interrogator. Upon receiving the activation signal, the RFID tag is activated to process and/or transmit data. In the systems of the present invention, the RFID tag includes a chip or other digital storage medium in which a digital encoded image and, in some embodiments, encoding parameters or other authentication information are stored. When the RFID tag encounters an interrogator signal, such as may be encountered at an authentication station, the RFID tag transmits authentication data including the digital encoded image to the interrogator, which can then pass the authentication data to an authentication processor.

The use of RFID may reduce or eliminate the need for other data storage systems, such as magnetic stripes or bar codes, and thus reduce or eliminate the difficulties associated with reading such media.

Various aspects of the encoded image authentication will now be discussed in more detail beginning with discussion of optically encoded images and their use in authenticating objects. Optically encoded images are typically images or indicia embedded in a background or source image and printed on items that may be subject to alteration, falsification or counterfeiting. As used herein, the term "encoded image" refers to an image that is manipulated and/or hidden within a background field or within another image in such a way that when applied or printed, the encoded image cannot be discerned by the human eye without the use of a decoding device. Some encoded images are hidden so that their presence is difficult to discern from a background or primary image. Other encoded images are easily visible but not readable because the image content has been systematically scrambled or otherwise manipulated.

Encoded images of particular significance to the present invention are those that are configured to be optically decoded using a lens-based decoding device. Such images take advantage of the ability of certain types of lenses (e.g., a lenticular lens) to sample image content based on their optical characteristics. For example, a lenticular lens can be used to sample and magnify image content based on the lenticule frequency of the lens. The images used are typically encoded by one of several methods that involve establishing a regularized periodic pattern having a frequency corresponding to that of the lenticular lens to be used as a decoder, then introducing distortions of the pattern that corresponds to the content of the image being encoded. These distortions may be made so small as to render the image difficult or impossible to discern from the regularized pattern with the naked eye. Encoded images of this type can be produced in an analog fashion using specialized photographic equipment as disclosed in U.S. Pat. No. 3,937,565 or digitally as is disclosed in U.S. Pat. No. 5,708,717 ('717 Patent), both of which are incorporated herein by reference in their entirety.

Digitally encoded images can be embedded into a background or into other images so that the mere presence of the encoded image is difficult to discern. With reference to FIG. 1, an encoded image 10 may be established using a primary or source image 20 and a secondary image 40, which is embedded into the primary image 20 in such a way that the secondary image 40 can only be viewed with a decoding device 3030 of a predetermined frequency. The primary image may be a blank gray or colored background image as in the encoded image 10 of FIG. 1 or may include visible image content such as a design or photograph or any other form of indicia, The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 30 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 30 is oriented at the decoding angle α with respect to the horizontal axis 22 of the encoded image 10. The decoding angle α is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern However, when a lenticular lens having a frequency corresponding to the predetermined frequency is placed over the primary image, it will sample the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

Another method of embedding an image is commonly used in banknotes and checks, In this method a latent image is created by changing the direction of raster elements in the visible images at positions corresponding to the content in the hidden image. For example, vertical raster lines in the primary image may be changed to horizontal lines at the locations corresponding to the latent image. The latent image can typically be seen by tilting the banknote slightly. However, the deviations in the primary image can also be decoded using an optical decoder. This is because the raster lines of the primary image will run along the length of the lenticular line of the decoder at the positions where there is no hidden content, but will have only a cross section at the positions where there is a hidden content. This difference makes the hidden image appear much brighter than the visible when viewed through the decoder.

The common thread of all of the above graphical encoding methods and their resulting encoded images is that they involve deviations from regular periodic behavior (e.g., spatial location, tone density, raster angle). The regular periodic behavior and the deviations therefrom may be established based on the encoding methodology used and a predetermined set of encoding parameters. The deviations are made apparent through the use of a decoder having characteristics that correspond to one or more of the encoding parameters. For example, one of the encoding parameters may be the frequency of the regular periodic behavior. The decoder (whether hardware or software-based) must be configured according to that frequency. For example, in the case of a lenticular lens, the lens frequency is established so that the frequency of the regular periodic behavior is equal to the lens frequency or an even multiple of the lens frequency. The lenticular lens may then act as a content sampler/magnifier that emphasizes the deviations from the regularized behavior and assembles them into the secondary image.

A lenticular lens can be used to decode both visible encoded images whose content has been systematically scrambled and encoded images embedded into a primary image or background. As described in U.S. patent application Ser. No. 11/068,350, ('350 Application) however, software-based decoders can also be used to decode encoded images that have been digitally created or captured. These decoders may be adapted to decode any digital version of an optically encoded image including digital encoded images that have never been printed and printed encoded images that have been scanned or transformed by other means into digital form. The digital encoded images may be latent images embedded into background or primary images or may be visible images that have been systematically scrambled or manipulated. The primary image may be a blank image with no discernible content (e.g., a gray box) or may be an actual image with discernible content.

Software for digitally decoding digital encoded images may be incorporated into virtually any data processor. For the purpose of practicing the authentication methods of the present invention, the software may use any decoding methodology including, but not limited to, the methods described in the '350 Application. This includes (1) methods that require information on the content of the primary image, the secondary image or both the primary and secondary images; and (2) methods that do not require any foreknowledge regarding image content. Both of these method types require knowledge of the encoding parameters used to encode and embed the secondary image.

Digital encoded images produced by any of the above-described encoding methods may be printed or otherwise applied to a document or other object so that they may be directly viewed by the human eye or optical device. As part of an authentication process, printed encoded images may be scanned or digitally captured using an image acquisition device such as a scanner or digital camera The captured encoded image may be processed by a decoding processor adapted to apply one or more software-based decoding algorithms to produce a decoding result. Using such methods as optical character recognition (OCR), the decoding processor may also be adapted to extract indicia and/or information from the decoded image and to compare the extracted indicia and/or information to predetermined authentication criteria.

In addition to or instead of being printed, the digital encoded images described above may be transmitted to a requester or stored for later use. The images may also be stored in a digital storage medium attached (or attachable) to the object to be authenticated. Some or all of the encoding parameters used to encode the digital encoded image may also be stored on the digital storage medium attached to the object. Alternatively or in addition, the encoding parameters may be stored in a separate storage facility accessible by the encoding processor. The object may then be authenticated by downloading the digital encoded image from the digital storage medium, decoding the digital encoded image, and comparing the decoded content to predetermined authorization criteria.

Figure 2:
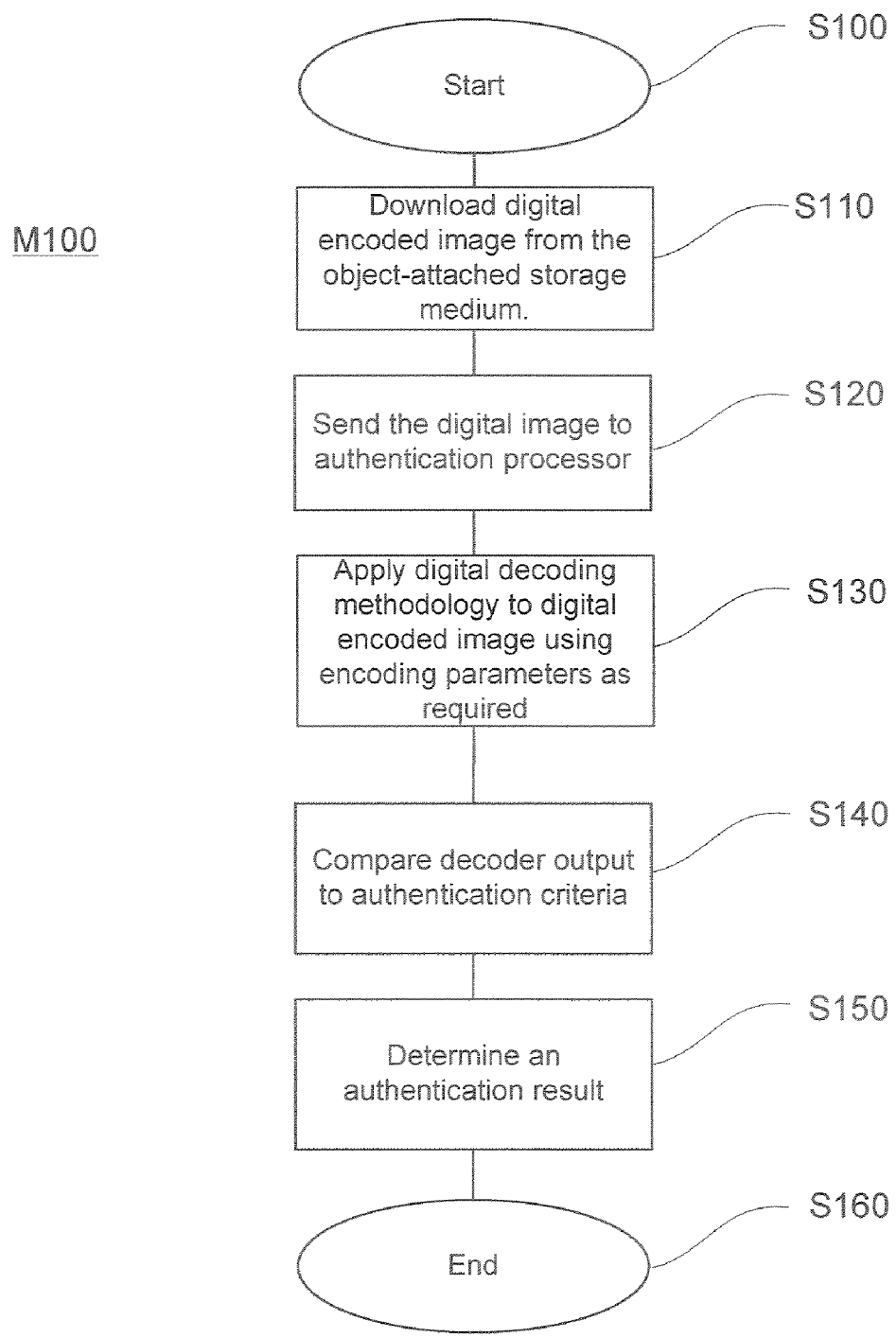
FIG. 2 is a flowchart of a method of authenticating an object according to an embodiment of the invention.

With reference now to FIG. 2, a basic authentication method M100 according to the present invention makes use of the ability to digitally decode a digital encoded image. The method M100 may be used to inspect a test object to determine if an expected encoded image has been stored in a medium attached thereto, the expected encoded image having been stored on all authentic objects. As used herein, the term "authentic" typically indicates that an object was produced by an authorized source or in an authorized manner. The expected encoded image is an encoded version of a predetermined authentication image. The expected encoded image may be the same for every object being tested or may be a variable encoded image that is different for each object. Any object not carrying the expected encoded image may be assumed to be indicative of non-authenticity or indicative that the object or indicia applied thereto has been altered.

The method M100 begins at S100 and at S110 a digital image of the test object is downloaded from the digital storage medium attached to the object being tested. This may be accomplished using any receiving device suitable for interaction with and reception of information from the particular storage medium used. Depending on the nature of the object and the form of storage medium, the downloading step may require physical interaction between the receiving device and the object and/or the attached medium. For example, in embodiments where the encoded image is stored on a magnetic medium (e.g., a magnetic stripe), the medium may need to be passed through a magnetic medium reader. This may require interaction of the entire object or a portion of the object with the magnetic medium reader. Chip-based embodiments may require electrical communication between the receiving device and electrical contacts on the object or the storage medium. In other embodiments, such as those using radio transmission, the object and the attached medium need only be placed within a certain proximity of an interrogator device.

As will be discussed in more detail below, in embodiments where the encoded image is stored on an RFID device, the object may be placed within range of an RFID interrogator emitting an activation signal. The activation signal would energize the RFID device which would, in response, transmit a data signal including the stored digital encoded image. The data signal would be received by an RF receiver, which can interpret, store or further transmit the data to complete the image download.

At S120, the digital encoded image is sent to an authentication processor. As will be discussed, some or all of the authentication processor may be co-located with the inspection site (i.e., the location where the digital image is downloaded from the object) and some or all of the authentication processor may be remote from the inspection site. In either case, the authentication processor may be connected to the image acquisition device over a network.

The authentication processor may be configured to automatically carry out some or all of the remaining steps of the method M100. At S130, the authentication processor decodes the digital encoded image. This may include determining one or more of the encoding parameters that were used to encode the authentication image to produce the expected encoded image. The number of parameters required may depend on the specific digital decoding methodology used. The encoding parameters may be obtained from data storage where they are placed at the time of encoding. This data storage may be a part of or co-located with the authentication processor or may be disposed in a separate database processor or server accessible to the authentication processor over a network. In some embodiments, some or all of the encoding parameters may be stored on the digital storage medium attached to the object being authenticated. These encoding parameters may be downloaded and sent to the authentication processor along with the digital encoded image. The encoding parameters and or the authentication image ray be object-specific or may be constant for a particular set of objects. In some embodiments, some or all of the encoding parameters may be received with an encoding request or determined from the content of the image. Encoding parameters may also be indirectly keyed to information that can be extracted from the object. For example, a country code extracted from the machine readable zone of an ICAO-compliant passport could be used to look up the encoding parameters used for that country's passport program.

The authentication processor applies a digital decoding methodology to the captured digital image to produce a decoding result. The decoding result may then be compared to object-related information or other authentication information. This may be accomplished by displaying the decoding result for visual comparison to the authentication image. Alternatively, OCR or other pattern recognition software can be used to extract information from the decoding result. This information can then be compared to information in the authentication image or information associated with the object being authenticated. In instances where the authentication image contains information that is object-specific, the information content of the decoding result may be compared to information derived directly from the object.

At S150, an authentication determination is made based on the comparison of the decoding result to authentication criteria. This determination may be made by a human reviewer of the decoding result or may be made automatically by the authentication processor. In either, case, the authentication result may be stored and/or returned to a user or other authorized requestor(s). In embodiments where the authentication determination is made at a location remote from the inspection site, the authentication determination may be transmitted to the inspection site. The authentication criteria may include, by way of example only, such factors as whether the decoded image sufficiently closely matches the authentication image used to produce the encoded image; whether information extracted from the decoded result matches information appearing on or otherwise associated with the object; and whether information extracted from the decoded image matches information associated with the generation of the encoded image. The method ends at S180.

Figure 3:
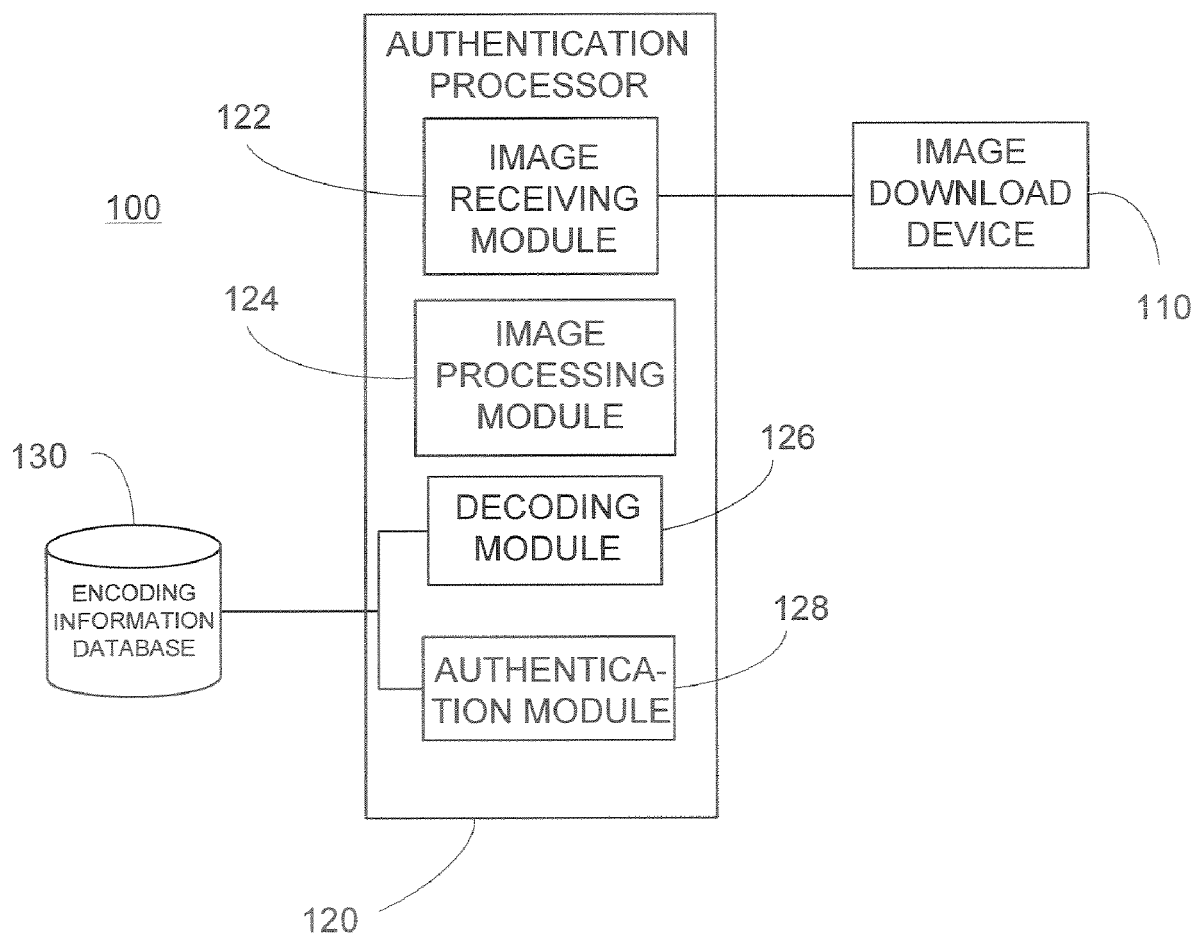
FIG. 3 is a schematic illustration of an object authentication system according to an embodiment of the invention.

With reference to FIG. 3, the method M100 and other methods according to the invention may be carried out using an object authentication system 100 comprising a digital image download device 110 and an authentication processor 120. The object authentication system 120 may also comprise an encoding information database 130 that may be included in or in communication with the authentication processor 120. The object authentication system 100 is configured for inspection and authentication of test objects to verify the presence of an encoded authentication image thereon. Some or all of the encoding parameters and the authentication image used to encode the authentication image may be stored in the encoding information database 130 so that they are accessible to the authentication processor 120. As previously noted, some or all of the encoding parameters may be derivable from information on or associated with the object, or may be stored with the encoded image stored on the object-attached storage medium, or may be stored on a separate object-attached medium.

The authentication processor 120 may be any data processor configured for receiving and processing digital images. The authentication processor 120 includes an image receiving module 122 adapted for selective communication with the image download device 110 and for receiving digital images therefrom. The image receiving module 122 transfers the captured digital images to an image processing module 124. The captured digital image may also be stored in a database in the authentication processor. The image processing module 124 may be adapted for performing any preprocessing required before the captured digital image can be digitally decoded.

The authentication processor 120 also includes a decoding module 126 and an authentication module 128. The decoding module 126 may be programmed with digital decoding software adapted for performing one or more decoding algorithms on the captured digital image to produce a decoding result. The decoding module 126 may obtain from the encoding information database any information (e.g., the authentication image and encoding parameters) needed for decoding the captured encoded image. The decoding result may be passed to the authentication module 128, which compares the decoding result to one or more authentication criteria to establish an authentication result. The decoding result, the authentication result or both may be stored in memory, or in a local or remote database, or displayed for use by an on-site inspector or other user.

The components of the authentication system 100 may be interconnected via any suitable means including over a network. The authentication processor 120 may take the form of a portable processing device that may be carried by an individual inspector along with a hand-held image download device. In some embodiments of the invention, the image download device and the authentication processor may actually be integrated into a single unit. Alternatively, the inspector may carry only a digital download device 110 that is selectively connectable to a remotely located authentication processor 120. For example, a download device 110 may be configured to send a downloaded image to the authentication processor by electronic mail.

The image download device 110 may be any device adapted for interaction with and reception of information from the particular storage medium applied to the object. Depending on the storage medium used, the download device 110 may include a magnetic stripe or tape reader a processor configured for selective connection to an integrated circuit, smart card, processor chip or memory chip, an optical disc or laser card reader, laser, bar code reader or other suitable device.

In particular embodiments, the image download device 110 may include an RFID interogator 112 for use in interrogating object-mounted RFID tags on which a digital encoded image may be stored. (See FIG. 4.) As discussed above, RFID allows wireless communication between an RFID tag and an RFID interrogator. The RFID interrogator 112 may comprise a transmitter 114 for transmitting command signals, a receiver 116 for transmitted data from an interrogated RFID tag 52 attached to an authenticable object 50 such as a passport, and a power supply 118. The interrogator 112 may also include an internal processor 119 for processing or translating the received signal. The RFID tag 52 will generally comprise an antenna 54 to receive and transmit signals, a memory chip 56 or other form of digital storage medium, and, optionally, an internal power supply (not shown).

The authentication system 100 is well adapted for use in authenticating a large number of similar objects such as, for example, packaged items in a warehouse or a large number of similar documents. The authentication processor 120 may be adapted so that information relating to individual objects (e.g., passports or other unique documents) may be entered by an operator, derived from the captured digital image, or downloaded from a data storage medium attached to or associated with the object. This allows the association of the captured digital image with the particular object and or specific characteristics of the particular object. This, in turn, allows the retrieval of object-specific encoding information, which may be required for decoding the captured encoded image or for determining an authentication result.

It will be understood that if the encoding information is not object-specific, a group of test objects with the same expected encoded image can be authenticated by the authentication processor 120 using a single set of encoding information. This set of encoding information can be obtained from the encoding information database 130 once and stored in the memory of the authentication processor 120 where it is accessible to the decoding and authentication modules 126, 128.

The authentication system 100 is also well adapted for use in authenticating unique objects such as identification documents (driver's licenses, passports, visas, etc.), credit cards and property titles. In such instances, the image downloading device 110 will often be a part of an inspection station where the carriers of such items are processed in sequence. As in other scenarios, each document (or other unique object) carries a digital storage medium with a digital encoded image stored therein. Because each authenticable object carries unique information, the digital encoded image is also unique and preferably is generated from includes an authentication image or other authentication indicia that can be directly or indirectly compared to an image or information carried on the object. The inspection station may a include a video screen that allows an operator to directly view a decoding result and compare it to the object directly or from which he can read information for comparison to information taken from the object.

Figure 4:
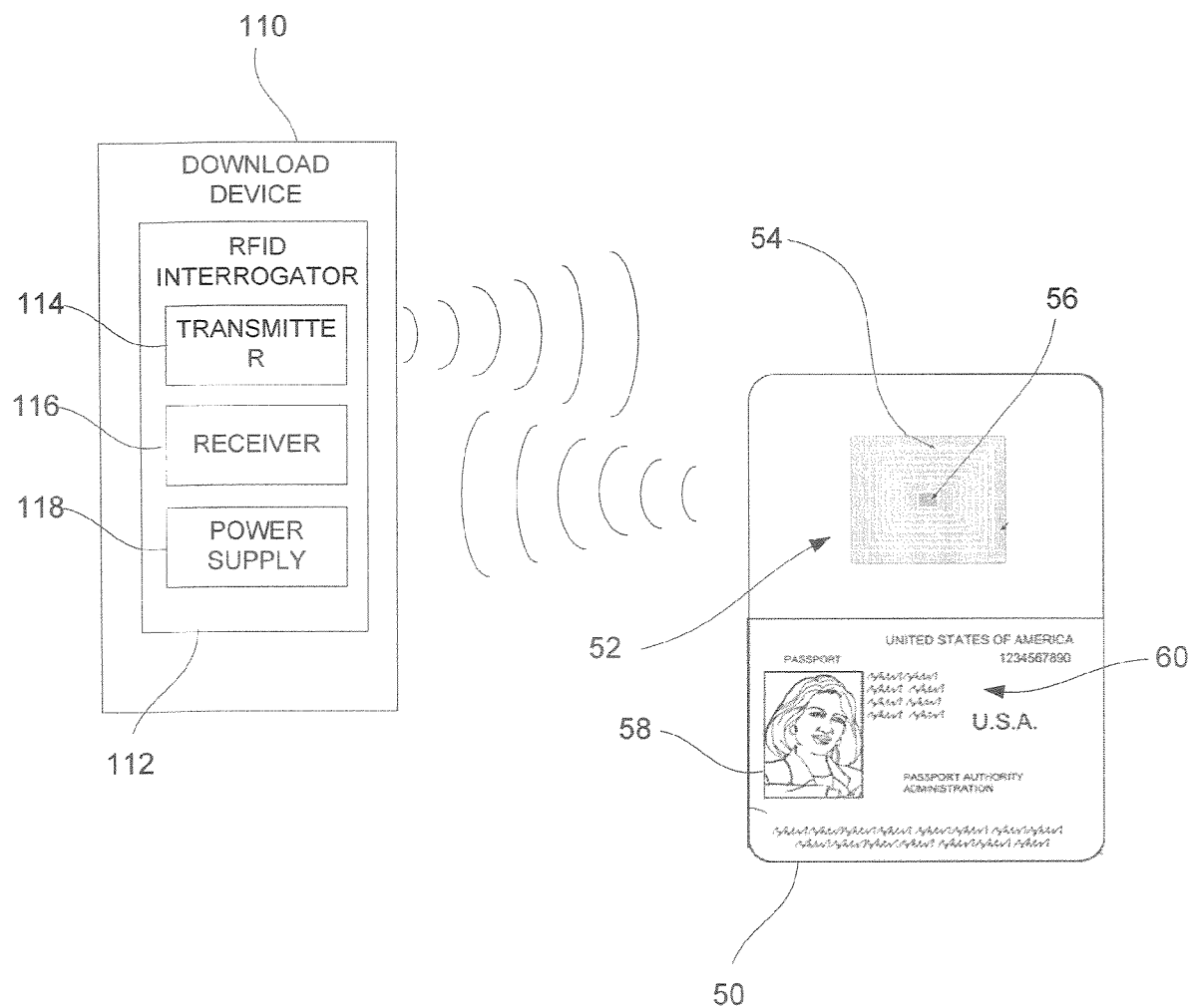
FIG. 4 is a schematic representation of an RFID-based download device that may be used in embodiments of the invention.

In one illustrative example, a passport similar to that shown as authenticable object 50 in FIG. 4 includes a photograph 58 of the owner along with other identification information 60. A digital encoded image is stored in the data chip 56 of an RFID tag 52 affixed to the inside of the cover of the passport. The digital encoded image may include any of various forms of authentication information that may be compared to the visible indicia on the passport once the digital encoded image is decoded. For example, the digital encoded image may be formed from an authentication image identical to that of the passport photograph 58. Alternatively, the digital encoded image may be formed using indicia of information that can be compared to the identification information 60. In either case, decoding the digital encoded image allows an immediate determination as to whether the visible indicia has been altered. For example, encoding/embedding personal information in a digital version of a passport photo prevents both photo substitution (the replacement photo would not contain encoded data) and data alteration (altered data would not match the data decoded from the photo).

Figure 5:
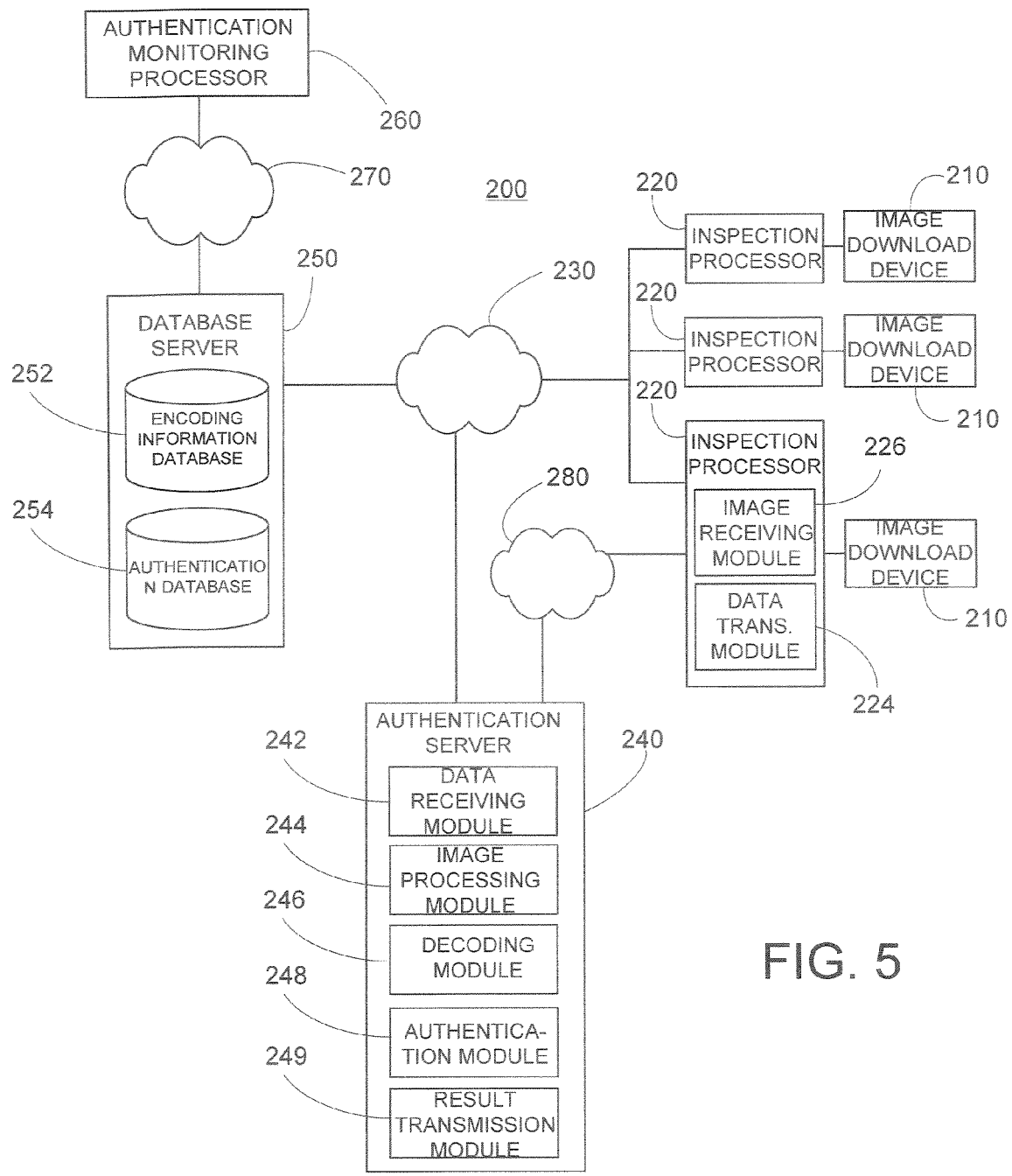
FIG. 5 is a schematic illustration of a network-based object authentication system according to an embodiment of the invention.

It will be understood that in any of the above systems and methods, the functions of the authentication processor need not be carried out on a single processing device. They may, instead be distributed among a plurality of processors, which may be interconnected over a network. Further, the encoding information required for decoding the captured encoded images taken from test objects and the decoding and authentication results may be stored in databases that are accessible to various users over the same or a different network. With reference to FIG. 5, an authentication system 200 comprises one or more inspection processors 220, an authentication server 240 and a database server 250 in selective communication with one another via one or more networks 230, 270, 280.

Each inspection processor 220 is in communication with one or more associated image download devices 210 adapted for capturing digital images of at least a portion of test objects to be authenticated. Each inspection processor 220 may include an image receiving module 222 adapted for receiving captured digital images from the data acquisition device 210. The inspection processor 220 may also include a data transmission module 224 adapted for transmitting an authentication request including the captured digital image to the authentication server 240 over a first network 280. Alternatively, the transmission module may transmit the captured digital image to the database server 250 for later authentication. The inspection processor 220 may be configured for entry of data associated with the object from which a particular digital image has been captured. Alternatively, the inspection processor may be provided with software for processing the captured digital image to identify and store information related to the object. For example, the captured digital image may include recognizable indicia such as a bar code or numerical identifier which can be decoded to provide information relating to the object.

The inspection processor 220 may optionally include its own image processing, decoding and authentication modules similar to those previously described for the authentication processor 120 of authentication system 100. Decoding and authentication results produced by the inspection processor may be compared to results obtained from the authentication server or may be stored for later use. To facilitate image decoding, the inspection processor 220 may be configured to retrieve encoding parameters and/or authentication images from the database server 250 over a second network 230, which may be the same as the first network 280.

The transmission module 224 may be adapted for transmitting the authentication request over the first network 280. In addition to the captured digital image, the transmission request may include additional information associated with the object from which the digital image was captured. This may include any decoding or authentication result produced by the inspection processor 220. The captured digital image and any associated information may be transmitted directly to the authentication server 240 or may be temporarily stored on the database server 250 or another server for later access by the authentication server 240. The authentication request may also include additional information such as information relating to the particular inspection processor and/or the inspector/user, user security information (e.g., user name and password), the location of the inspection site, etc.

The authentication server 240 may comprise a data receiving module 242 configured for receiving the captured digital image and associated information from the inspection processor 220. The data receiving module 242 may alternatively or additionally be configured for retrieving such information from the database server 250 over the second network 230 or a different network. The data receiving module 242 may be adapted to verify user credentials and provide a request acknowledgment back to the inspection processor. The data receiving module 242 may also be configured to transmit a denial of the authentication request if the user credentials or security information provided indicate that the request does not meet predetermined authorization criteria.

The authentication server 240 includes image processing, decoding and authentication modules 244, 246, 248 similar to those previously described for the authentication processor 120 of authentication system 100. Upon establishing that the authentication request was obtained from an authorized user and is associated with an object for which associated encoding information is available, the data receiving module passes the captured digital image to the image processing module 244 to initiate the decoding process. One or more of the authentication server modules 242, 244, 246, 248 may be adapted for retrieving information stored in the database server 250. The database server 250 may include an encoding information database 252, on which may be stored some or all of the authentication image and encoding parameters used to encode the authentication image associated with the objects being authenticated, it will be understood that such encoding information may be stored for a large number of unrelated authenticable objects and object groups for a variety of client users. The information is retrieved based on the object information provided with the authentication request or derived from the captured digital image itself. The retrieved information may be used by the decoding module 246 to produce a decoding result and by the authentication module 248 to produce an authentication result.

The authentication server 240 may also comprise a result transmission module 249 adapted to assemble and transmit an authentication request response including the authentication result. In some embodiments, the request response may also include the decoding result and/or other object-related information. The request response may be transmitted to the inspection processor 220 or other previously designated recipient via the first network 280. The authentication result, decoding result, or both may alternatively or in addition be transmitted over the second network 230 for storage in an authentication database 254. The authentication database 254 may reside on the database server 250 or another server connected to the network 230. The authentication database 254 may be made selectively accessible to one or more authentication monitoring processors 260 over a third network 270. This allows authorized users to access the authentication database to monitor individual and cumulative authentication information and statistics.

It will be understood that the networks 230, 270 and 280 may be the same or different networks. Any or all of these may be any form of local or wide area network. Any or all may, for example, be or include the Internet to allow a large number of widespread users. Network 280 may also be a telecommunications network over which digital images may be transmitted from image acquisition devices such as camera phones. Network 280 may also be a Wi-Fi, WiMAX or other form of wireless network. It will also be understood that the modules and functions of the authentication server 240 may be distributed among multiple interconnected servers and processors.

The authentication systems of the invention are highly flexible and can be used in a wide variety of authentication scenarios. In a typical scenario, an encoded authentication image is loaded onto a digital storage medium such as the data chip of an RFID tag. The RFID tag or other storage medium is then permanently attached to a product (either to a manufactured item itself or to the packaging for that item) that is subject to counterfeiting or tampering. It will be understood that in some instances the storage medium may be attached to the product before the digital encoded image is loaded. The product may then be shipped or stored. Encoding information is stored in a database accessible to one or more authentication servers.

An on-site inspector equipped with a portable inspection processor and an image download device may be dispatched to a site such as a warehouse where a group of packaged products are stored. The inspector may use the image acquisition device to scan or otherwise capture a digital image of the target area of a suspect product package. Additional information such as date, time, location, product serial number, etc., may be entered by the inspector. Some of this information may alternatively be entered automatically by the inspection processor. If the inspection processor is equipped with its own decoding and authentication software, the inspector may authenticate the suspect product immediately. Alternatively or in addition, the inspection processor may be used to submit an authentication request to a remote authentication server. Authentication requests may be sent on an individual item basis. Alternatively, downloaded encoded images and associated product information may be collected for multiple test items and submitted as part of a single authentication request. This would allow, for example, the inspection processor to be used independently of a network connection to collect authentication data from a plurality of test items, then connect to the network (e.g., by logging into an Internet website) for submitting a single batch authentication request.

Upon receiving the authentication request from the inspection processor, the authentication server validates the request, retrieves any required image encoding information from the encoding information database and processes the downloaded digital encoded image. The image is then decoded and compared to retrieved authentication criteria to determine an authentication result The authentication result may then be stored in an authentication database. A representative of the manufacturer or other authorized user is then able to access the authentication results by connecting to the authentication database. In some embodiments, this may be accomplished by logging into a security-controlled website and submitting a request for authentication results for the test objects.

In some embodiments, the authentication server may be configured for access through a web site. Authorized users can log onto the web site, upload scanned images, and immediately receive an authentication result on their browser. Results can also be stored in an authentication database for future reviews.

In some embodiments, a web-based authentication service may be implemented using standards for interface and data representation, such as SOAP and XML, to enable third parties to connect their information services and software to the authentication service. This approach would enable seamless authentication request response flow among diverse platforms and software applications.

In a typical passport inspection scenario, the owner would present the passport to an inspection operator or an automated passport processing system at an inspection station. The inspection station would include a download device having an RFID interrogator. The interrogator would automatically interrogate the RFID tag, which would transmit the digital encoded image and, in some cases, encoding information back to the interrogator. The interrogator would then transmit the encoded image and the encoding information to an authentication processor, which may be on site at the inspection station or which may be remotely accessible via a network. The authentication processor decodes the digital encoded image. The decoding result may then be presented visually to an inspector or may be compared to other object information that has been automatically or manually obtained. Such information could, for example, be read from the passport using a scanner and OCR technology or from a magnetic stripe or bar code. The inspector or the automated system then compare the image or information from the decoding result to the other information from the passport to assure that they match.

In a particularly secure system, a passport or other authenticable object having an encoded image digitally stored on-object may also have the same or a different encoded image printed on or otherwise visually applied to it. This printed encoded image may be scanned and decoded using the methods described in the '350 and '437 Applications. The decoding result may then be compared to, not only the visible information indicia on the object, but also the decoding result from the digital encoded image stored on-object. This approach can be made particularly secure if different encoding parameters are used to encode the two encoded images. It will be understood that the use of a printed encoded image would require that the authentication system include a decoder capable of decoding the printed encoded image. This could be a hardware decoder or a software-based decoding system including a digital image capturing device (e.g., a scanner or digital camera) as described in the '350 and '437 Applications.

Yet another security advantage is provided if different encoding parameters are used for the printed and digital encoded images. This would create another hurdle for a counterfeiter, because he would have to break and replicate two separate encodings to create a counterfeit document. Authentication could still be accomplished using a single processor, which could decode the printed image separately from the digital image and compare the decoding result from the two images to one another and/or to information from an independent data source such as the machine readable zone on a passport, to establish an authentication result.

In a variation on this two-image approach, decoding one of the two encoded images may be used to obtain the encoding parameters of the other encoded image, which can then be decoded using these parameters.

In another variation, the printed encoded image may be formed using a print medium that is difficult or impossible to view in the visible spectrum. The printed encoded image may be formed using a light transmittent print medium (e.g., a clear varnish) as described in U.S. Pat. No. 6,980,654, which is incorporated herein by reference in its entirety. Alternatively, the printed encoded image may be formed using infrared (IR) or ultraviolet (UV) print media. The use of such print media would require that the digital image capturing device of the decoding system be capable of capturing the image in IR or UV light.

The use of both printed and on-object digital image storage has value in other ways as well. A printed encoded image can, for example., provide a backup for when the digitally stored image cannot be downloaded or some legitimate reason (e.g., malfunction due to wear and tear, production error, reader error, etc.). Having a printed encoded photo provides object protection even in this scenario.

It will be understood that other network-based authentication systems such as those disclosed in the '437 Application may be used in conjunction with the authentication systems and methods of the present invention.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method of authenticating an object comprising:
   attaching a digital data storage medium to the object;
   storing an optically decodable digital encoded image in the data storage medium, the digital encoded image comprising authentication information determinable by decoding the digital encoded image;
   downloading the digital encoded image from the digital data storage medium;
   applying a digital decoding algorithm to the captured digital image to establish a decoding result; and
   comparing the decoding result to object authentication criteria to establish an authentication result.

2. A method according to claim 1 further comprising:
   extracting authentication information from the decoding result.

3. A method according to claim 1 wherein the object authentication criteria include object information determinable by visual inspection of the object.

4. A method according to claim 3 wherein the authentication information comprises an authentication image encoded into the digital encoded image and wherein the object information includes a printed version of the authentication image.

5. A method according to claim 1 wherein the authentication information comprises at least one of the set consisting of an authentication image encoded into the digital encoded image and one or more encoding parameters used to encode the digital encoded image.

6. A method according to claim 1 wherein the object is a printed document containing visible indicia and wherein the authentication information is uniquely associated with the printed document.

7. A method according to claim 6 wherein at least a portion of the authentication information is derived from the visible indicia.

8. A method according to claim 6 wherein the printed document is a personal identification document uniquely associated with a particular person.

9. A method according to claim 1 wherein the action of downloading is carried out at an inspection station and the action of applying a digital decoding algorithm is carried out by an authentication processor remote from the inspection station, the method further comprising:
transmitting the downloaded digital encoded image from the inspection station to the authentication processor; and
transmitting at least one of the set consisting of the decoding result and the authentication result from the authentication processor to the inspection station.

10. A method according to claim 9 wherein the inspection station and the authentication processor are in selective communication over a network.

11. A method according to claim 1 further comprising:
applying a visible optically encoded image to the object, the visible optically encoded image comprising object authentication criteria; and
decoding the visible optically encoded image to determine the object authentication criteria.

12. A method according to claim 11 wherein the action of decoding the visible optically encoded image is carried out using a decoding lens.

13. A method according to claim 11 wherein the action of decoding the visible optically encoded image includes:
capturing a digital image of at least a portion of the test object including the visible optically encoded image;
applying a digital decoding algorithm to the captured digital image to establish a second decoding result; and
determining the authentication criteria from the second decoding result.

14. A method according to claim 1 wherein the digital data storage medium comprises at least one of the set consisting of an RFID tag, a magnetic stripe, a bar code, a processor chip and a memory chip.

15. A method of authenticating an object, the method comprising:
downloading a digital encoded image from a digital data storage medium attached to the object, the digital encoded image comprising authentication information determinable by decoding the digital encoded image;
applying a digital decoding algorithm to the captured digital image to establish a decoding result; and
comparing the decoding result to object authentication criteria to establish an authentication result.

16. A method according to claim 15 further comprising:
extracting authentication information from the decoding result.

17. A method according to claim 15 wherein the object authentication criteria include object information determinable by visual inspection of the object.

18. A method according to claim 17 wherein the authentication information comprises an authentication image encoded into the digital encoded image and wherein the object information includes a printed version of the authentication image.

19. A method according to claim 15 wherein the authentication information comprises at least one of the set consisting of an authentication image encoded into the digital encoded image and one or more encoding parameters used to encode the digital encoded image.

20. A method according to claim 15 wherein the action of downloading is carried out at an inspection station and the action of applying a digital decoding algorithm is carried out by an authentication processor remote from the inspection station, the method further comprising:
transmitting the downloaded digital encoded image from the inspection station to the authentication processor; and
transmitting at least one of the set consisting of the decoding result and the authentication result from the authentication processor to the inspection station.

21. A method according to claim 15 wherein the object has a visible, optically encoded image applied to a surface thereof, the visible optically encoded image comprising object authentication criteria and wherein the method further comprises:
decoding the visible optically encoded image to determine the object authentication criteria.

22. A method according to claim 15 wherein the digital data storage medium comprises at least one of the set consisting of an RFID tag a magnetic stripe, a bar code a processor chip and a memory chip.

23. A system for authenticating an object having a digital data storage medium attached thereto, the digital data storage medium having stored therein an optically decodable digital encoded image comprising authentication information, the system comprising:
a digital image download device adapted for selective communication with the digital data storage medium and for receiving the digital encoded image therefrom; and
a data processing system having
an image receiving module adapted for receiving the digital image from the digital image download device,
an encoding information database configured for storage of at least one of the set consisting of the authentication image and the set of one or more encoding parameters,
a decoding module adapted for applying an encoded image decoding algorithm to the digital image to produce a decoding result; and
an authentication module adapted for comparing the decoding result to object authentication criteria to determine an authentication result.

24. A system according to claim 23 wherein the data processing system comprises an inspection data processor that includes the image receiving module.

25. A system according to claim 23 wherein the inspection data processor further includes at least one of the set consisting of the decoding module and the authentication module.

26. A system according to claim 25 wherein
the inspection data processor further includes a data transmission module in selective communication with a network, the data transmission module being adapted for transmitting the digital image over the network, and wherein
the data processing system further comprises an authentication server including a data receiving module in selective communication with the network and being adapted for receiving the digital image from the inspection data processor.

27. A system according to claim 26 wherein the authentication server includes at least one of the set consisting of the decoding module and the authentication module.

28. A system according to claim 23 wherein the digital data storage medium comprises an RFID tag and the digital image download device comprises an RFD interrogator.

29. An authenticable object comprising:
an object having authentication information associated therewith;
a digital data storage medium attached to the object, the digital data storage medium having an optically decodable digital encoded image stored therein, the digital encoded image comprising decodable indicia including at least a portion of the authentication information,
wherein the digital encoded image can be downloaded from the digital data storage medium.

30. An authenticable object according to claim 29 wherein the digital data storage medium comprises at least one of the set consisting of an RFID tag, a magnetic stripe, a bar code, a processor chip and a memory chip.

31. An authenticable object according to claim 29 wherein the authentication information includes object information determinable by visual inspection of the object.

32. An authenticable object according to claim 31 wherein the authentication information comprises an authentication image encoded into the digital encoded image and wherein the object information includes a printed version of the authentication image.

33. An authenticable object according to claim 29 wherein the authentication information comprises at least one of the set consisting of an authentication image encoded into the digital encoded image and one or more encoding parameters used to encode the digital encoded image.

34. An authenticable object according to claim 29 wherein the object is a printed document containing visible indicia and wherein the authentication information is uniquely associated with the printed document.

35. An authenticable object according to claim 34 wherein at least a portion of the authentication information is derived from the visible indicia.

36. An authenticable object according to claim 34 wherein the printed document is a personal identification document uniquely associated with a particular person.

37. An authenticable object according to claim 29 wherein at least a portion of the authentication information is stored in the digital data storage medium.

38. An authenticable object according to claim 29 further comprising an optically decodable encoded image applied to a surface of the object.

39. An authenticable object according to claim 38 wherein the digital encoded image was produced using a first set of encoding parameters and the applied encoded image was produced using a second set of encoding parameters having at least one encoding parameter in common with the first set of encoding parameters.

40. An authenticable object according to claim 38 wherein the digital encoded image was produced using a first set of encoding parameters and the applied encoded image was produced using a second set of encoding parameters having at least one encoding parameter not included in the first set of encoding parameters.

41. An authenticable object according to claim 38 wherein the applied encoded image is decodable to produce a decoding result that includes indicia of one or more encoding parameters used to encode the digital encoded image.

42. An authenticable object according to claim 38 wherein the applied encoded image is decodable to produce a decoding result that includes indicia of an authentication image used to encode the digital encoded image.

* * * * *